US012647925B2

(12) United States Patent
Khalid et al.

(10) Patent No.: US 12,647,925 B2
(45) Date of Patent: Jun. 2, 2026

(54) AUTOMATIC ANTENNA RADIATION PATTERN REGISTRATION

(71) Applicant: Charter Communications Operating, LLC, St. Louis, MO (US)

(72) Inventors: Saran Khalid, Denver, CO (US); Mohammedyusuf Shaikh, Aurora, CO (US); Perwaiz Akhtar, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 323 days.

(21) Appl. No.: 18/457,031

(22) Filed: Aug. 28, 2023

(65) Prior Publication Data

US 2025/0081137 A1      Mar. 6, 2025

(51) Int. Cl.
*H04W 60/04* (2009.01)
*H04W 28/16* (2009.01)

(52) U.S. Cl.
CPC ........... *H04W 60/04* (2013.01); *H04W 28/16* (2013.01)

(58) Field of Classification Search
CPC ...... H04W 60/04; H04W 28/16; H04W 16/14
See application file for complete search history.

(56) References Cited

U.S. PATENT DOCUMENTS

| | | | | |
|---|---|---|---|---|
| 11,438,769 B2 * | 9/2022 | Sevindik | ................. | H04W 8/26 |
| 2015/0016561 A1 * | 1/2015 | Negus | ................... | H04W 16/14 |
| | | | | 375/267 |
| 2015/0230105 A1 * | 8/2015 | Negus | ................... | H04W 72/20 |
| | | | | 370/329 |
| 2020/0260290 A1 * | 8/2020 | Srinivasan | ............ | H04W 16/14 |
| 2020/0275288 A1 * | 8/2020 | Beck | ..................... | H04W 16/30 |
| 2022/0038914 A1 * | 2/2022 | Beck | ................... | H04W 52/244 |
| 2022/0225109 A1 * | 7/2022 | Al-Mufti | .......... | H04W 52/243 |
| 2022/0346030 A1 * | 10/2022 | Al-Mufti | ............ | H04W 52/243 |
| 2025/0016713 A1 * | 1/2025 | Khalid | ................. | H04W 60/04 |
| 2025/0063581 A1 * | 2/2025 | Khalid | ................. | H04W 72/51 |
| 2025/0081137 A1 * | 3/2025 | Khalid | ................. | H04W 60/04 |
| 2025/0267469 A1 * | 8/2025 | Khalid | ................. | H04W 16/02 |

FOREIGN PATENT DOCUMENTS

WO      WO-2019199784 A2 *      10/2019      ............ H04W 72/56

* cited by examiner

*Primary Examiner* — Ivan O Latorre

(74) *Attorney, Agent, or Firm* — Dority & Manning, P.A.

(57) ABSTRACT

It is determined that a request has been received to make a change in a radiation pattern of an antenna coupled to a Citizens Broadband Radio Service Device (CBSD) from a first radiation pattern to a second radiation pattern. A registration object associated with the CBSD maintained by a spectrum access system (SAS) is obtained. A new radiation pattern characteristic of the second radiation pattern that is different from an existing radiation pattern characteristic of the first radiation pattern is determined. A new registration object that includes the new radiation pattern characteristic and omits the existing radiation pattern characteristic is generated. The new registration object is caused to be stored by the SAS in lieu of the registration object.

20 Claims, 8 Drawing Sheets

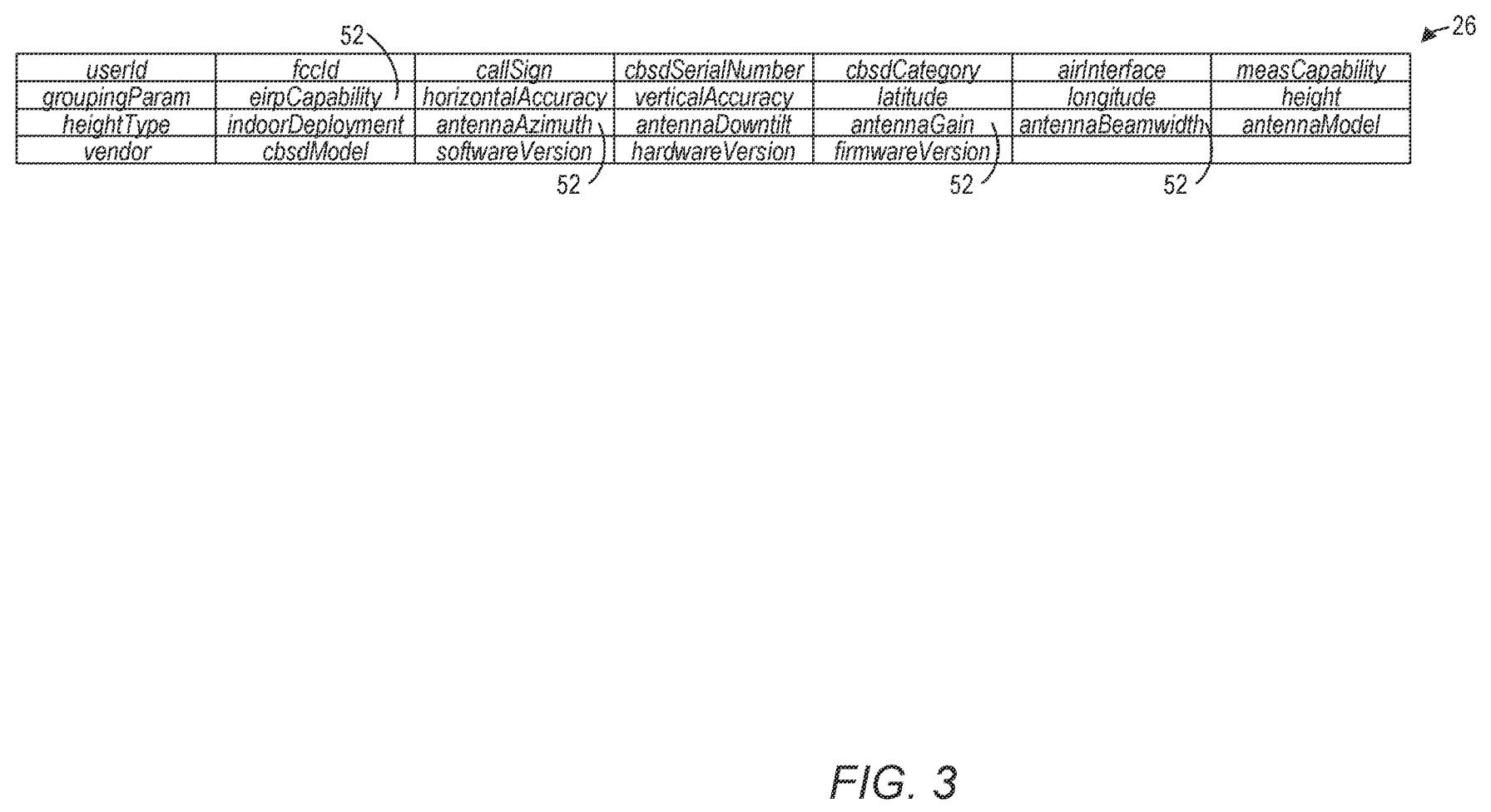

| userId | fccId | callSign | cbsdSerialNumber | cbsdCategory | airInterface | measCapability |
|---|---|---|---|---|---|---|
| groupingParam | eirpCapability | horizontalAccuracy | verticalAccuracy | latitude | longitude | height |
| heightType | indoorDeployment | antennaAzimuth | antennaDowntilt | antennaGain | antennaBeamwidth | antennaModel |
| vendor | cbsdModel | softwareVersion | hardwareVersion | firmwareVersion | | |

FIG. 3

AUTOMATIC ANTENNA RADIATION PATTERN REGISTRATION

BACKGROUND

A switched beam antenna has a configurable radiation pattern that can be changed. In a Citizens Broadband Radio Service domain, changing a radiation pattern for a switched beam antenna can be time-consuming, error-prone, and cause a Citizens Broadband Radio Service Device to be inoperable for a period of time while the change in radiation pattern is registered with a spectrum access system.

SUMMARY

The examples disclosed herein implement automatic antenna radiation pattern registration with a spectrum access system for Citizens Broadband Radio Service (CBRS) transmitters that eliminates the possibility of data entry errors, erroneous antenna radiation characteristic calculations, and minimizes the amount of time a Citizens Broadband Radio Service Device (CBSD) is out of service while an antenna radiation pattern is being changed.

In one example a method is provided. The method includes determining, by a computing system, that a request has been received to make a change in a radiation pattern of an antenna coupled to a CBSD from a first radiation pattern to a second radiation pattern. The method further includes obtaining, by the computing system, a registration object associated with the CBSD maintained by a spectrum access system (SAS) operable to maintain a plurality of registration objects, each registration object of the plurality of registration objects identifying radiation pattern characteristics of a radiation pattern of an antenna coupled to a corresponding CBSD. The method further includes determining, by the computing system, a new radiation pattern characteristic of the second radiation pattern that is different from an existing radiation pattern characteristic of the first radiation pattern. The method further includes generating, by the computing system, a new registration object that includes the new radiation pattern characteristic and omits the existing radiation pattern characteristic, and causing, by the computing system, the new registration object to be stored by the SAS.

In another example a computing system is provided. The computing system includes one or more computing devices operable to determine that a request has been received to make a change in a radiation pattern of an antenna coupled to a Citizens Broadband Radio Service Device (CBSD) from a first radiation pattern to a second radiation pattern. The one or more computing devices are further operable to obtain a registration object associated with the CBSD maintained by a spectrum access system (SAS) operable to maintain a plurality of registration objects, each registration object of the plurality of registration objects identifying radiation pattern characteristics of a radiation pattern of an antenna coupled to a corresponding CBSD. The one or more computing devices are further operable to determine a new radiation pattern characteristic of the second radiation pattern that is different from an existing radiation pattern characteristic of the first radiation pattern. The one or more computing devices are further operable to generate a new registration object that includes the new radiation pattern characteristic and omits the existing radiation pattern characteristic. The one or more computing devices are further operable to cause the new registration object to be stored by the SAS.

In another example a non-transitory computer-readable storage medium is provided. The non-transitory computer-readable storage medium includes executable instructions to cause one or more computing devices to determine that a request has been received to make a change in a radiation pattern of an antenna coupled to a Citizens Broadband Radio Service Device (CBSD) from a first radiation pattern to a second radiation pattern. The instructions further cause one or more computing devices to obtain a registration object associated with the CBSD maintained by a spectrum access system (SAS) operable to maintain a plurality of registration objects, each registration object of the plurality of registration objects identifying radiation pattern characteristics of a radiation pattern of an antenna coupled to a corresponding CBSD. The instructions further cause one or more computing devices to determine a new radiation pattern characteristic of the second radiation pattern that is different from an existing radiation pattern characteristic of the first radiation pattern. The instructions further cause one or more computing devices to generate a new registration object that includes the new radiation pattern characteristic and omits the existing radiation pattern characteristic, and cause the new registration object to be stored by the SAS.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 3 illustrates various data fields that may be stored in a registration object by a spectrum access system according to some implementations;

DETAILED DESCRIPTION

Figure 1:
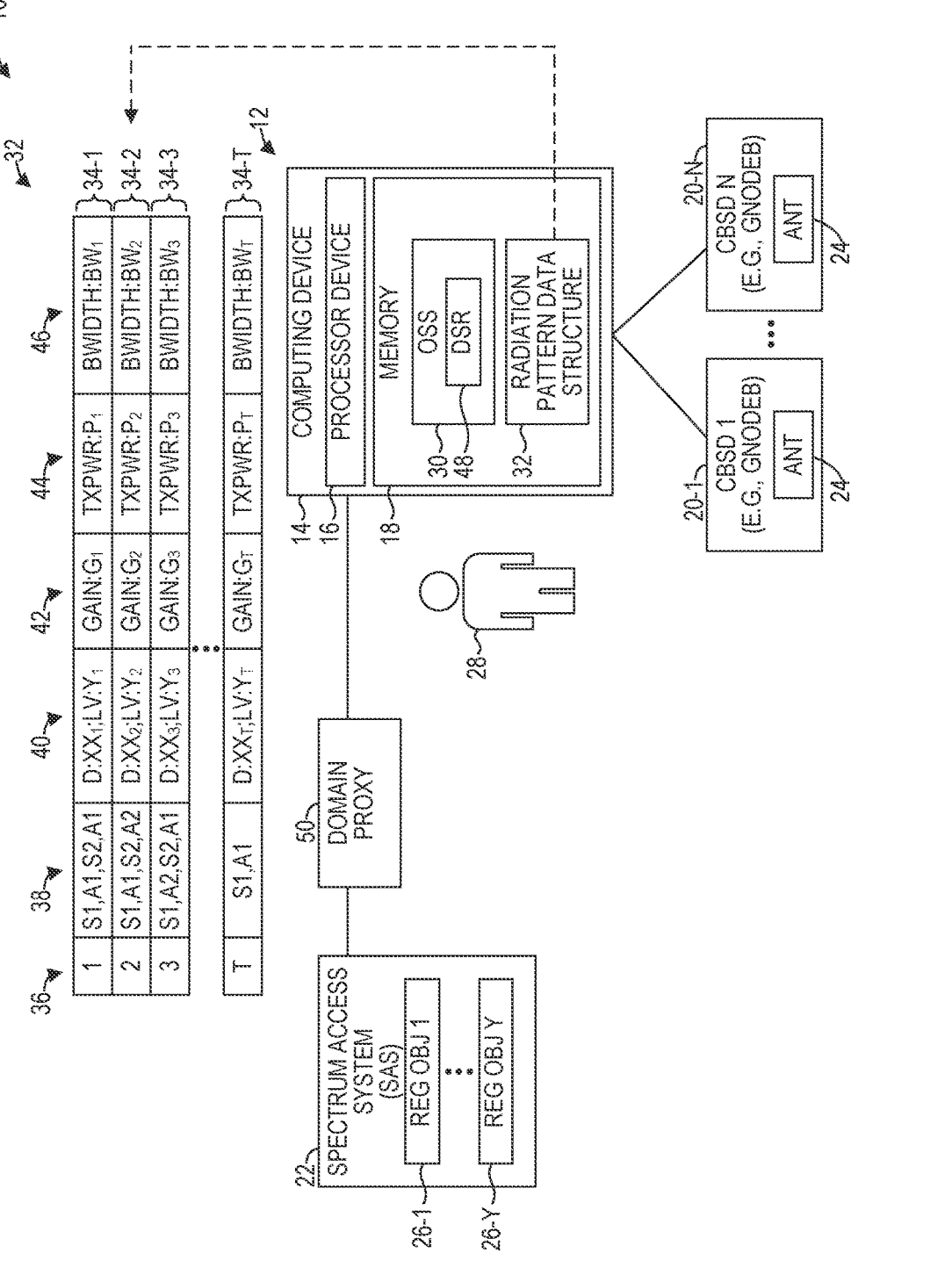
FIG. 1 is a block diagram of an environment in which automatic antenna radiation pattern registration can be practiced according to some examples.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

A switched beam antenna has a configurable radiation pattern that can be changed. Citizens Broadband Radio Service (CBRS) is a 150 MHz wide broadcast band of the 3.5 GHz band (3550 MHz to 3700 MHZ) in the United States. A Citizens Broadband Radio Service Device (CBSD), such as an Evolved NodeB (eNodeB) or gNodeB (sometimes referred to as gNB) by way of non-limiting example, is a transmitter device that operates in the Citizens Broadband Radio Service (CBRS) spectrum. The primary function of a Spectrum Access System (SAS) is to control spectrum access for a CBSD. Each CBRS domain includes a SAS.

It may be desired to change the radiation pattern of a switch beam antenna coupled to a CBSD to, by way of non-limiting example, increase capacity, avoid interference, or to serve a specific area where transmitters are in close proximity of each other. A CBSD cannot begin or change operation until a request to do so has been made to the SAS and the SAS has granted the request. The request identifies antenna radiation parameters, such as the allocated radio channels (frequency range) and the required Effective Isotropic Radiated Power (EIRP), or the maximum power level at which the device can transmit, the antenna azimuth, the antenna gain, and the antenna beamwidth, by way of example.

Logistically, if it is desired to change the radiation pattern of a CBSD that is coupled to a switch beam antenna, an operator interacts with a user interface, often one associated with an operator support system (OSS), to cause the current registration object associated with the CBSD to be removed from the OSS, and to cause a new registration object associated with the CBSD to be stored by the SAS. This involves entry of data from the operator, including information such as the new azimuth of the antenna, the new antenna gain value that identifies a gain of the antenna, and the new antenna beamwidth value that identifies a beamwidth of the antenna. If the SAS accepts the registration information, the SAS issues a grant that allows the CBSD to begin transmitting with the identified radiation pattern.

The steps involved with changing the radiation pattern of the CBSD are time-consuming and fraught with the potential for both data entry errors and, where certain radiation characteristics need to be calculated, calculation errors. Any such errors may prevent the SAS from issuing a grant, or, if issued, cause the CBSD to begin transmitting in an unexpected and undesired radiation pattern. Moreover, the CBSD halts transmission when the SAS removes the registration object, and thus for the period of time between registration object removal and the generation by the SAS of the new registration object, the CBSD cannot provide service.

The examples disclosed herein implement automatic antenna radiation pattern registration that eliminates the possibility of data entry errors, erroneous antenna radiation characteristic calculations, and minimizes the amount of time a CBSD is out of service while an antenna radiation pattern is being changed.

FIG. 1 is a block diagram of an environment 10 in which automatic antenna radiation pattern registration can be practiced according to some examples. The environment 10 includes a computing system 12 that includes one or more computing devices 14. Some or all of the computing system 12 may, in some implementations, be implemented in a cloud computing system. Each computing device 14 includes one or more processor devices 16 and a memory 18.

The environment 10 also includes one or more CBSDs 20-1-20-N (generally, CBSDs 20). Each CBSD 20 is coupled to one or more antennas 24. Each antenna 24 (or combination of antennas 24) has a radiation pattern (sometimes referred to herein as an antenna radiation pattern) that can be quantified by various metrics, such as, by way of non-limiting example, azimuth, gain, power, and beamwidth. The antenna(s) 24 coupled to a CBSD 20 may be integrated with the CBSD 20 such that the processor device, memory, and software of the CBSD 20 are in a same physical package as the antenna 24, or may be separate from the CBSD 20 and connected to the CBSD 20 via a cable or other medium via which the CBSD 20 can communicate with the antenna 24.

The CBSDs 20 operate in the CBRS spectrum. Spectrum access for the CBSDs 20 is controlled by a SAS 22. The SAS 22 maintains a plurality of registration objects 26-1-26-Y (generally, registration objects 26), each registration object 26 identifying radiation pattern characteristics of a radiation pattern of one or more antennas coupled to a CBSD 20. The term "registration object" as used herein refers to any mechanism via which the SAS 22 may maintain the relevant information regarding a radiation pattern, such as a record, an entry in a file, or the like, and does not imply any particular type of storage structure.

An operator 28 may determine that the radiation pattern of the antenna 24 associated with the CBSD 20-1 is to be changed, for purposes of increasing capacity, avoiding interference, or the like. The operator 28 interacts with an operator support system (OSS) 30 to cause a sequence of events, as will be described in greater detail below, to facilitate the change in the radiation pattern of the antenna 24-1. In one example, the OSS 30 may access a radiation pattern data structure 32 that identifies radiation pattern characteristics of one or more radiation patterns associated with a particular CBSD 20. In this example, the data structure 32 contains a plurality of columns that correspond to fields of each of a plurality of entries 34-1-34-T (generally, entries 34). Each entry 24 corresponds to a particular antenna radiation pattern associated with a CBSD 20. A column 36 identifies a particular radiation pattern identifier that may be entered by the operator 28 in the OSS 30 to select a particular entry 34. A column 38 identifies the particular antenna(s) 24 of the CBSD 20 that will be used for the selected radiation pattern, and the sector(s) that the antenna(s) 24 will cover. A column 40 identifies a particular degree and loss value associated with the selected radiation pattern. A column 42 identifies an antenna gain of the selected radiation pattern. A column 44 identifies the transmit power of the selected radiation pattern. A column 46 identifies a beamwidth of the selected radiation pattern.

As an example, the entry 34-1 identifies a particular radiation pattern 1 that can be implemented by a CBSD 20 via two antennas 24 to which the CBSD 20 is coupled. The degree is a value represented by $XX_1$, and the loss value is a value represented by $Y_1$. The gain is a value represented by $G_1$; the transmit power is a value represented by $P_1$; and the bandwidth is a value represented by $BW_1$. Each of values may be determined experimentally, calculated, or otherwise determined using known techniques.

The entry 34-2 identifies a particular radiation pattern 2 that can be implemented by a first antenna and second antenna to which the CBSD 20 is coupled. The degree is a value represented by $XX_2$ and the loss value is a value represented by $Y_2$. The gain is a value represented by $G_2$; the transmit power is a value represented by $P_2$; and the bandwidth is a value represented by $BW_2$.

In this example, the operator 28 desires a radiation pattern identified by the entry 34-2 and identifies the desired radiation pattern to the OSS 30. In this example, the OSS includes a Dynamic SAS Registrar (DSR) 48 that is operable to implement certain of the functionality described herein. In response to the request by the operator 28, the DSR 48 determines that the request has been made to change the radiation pattern of the antenna(s) 24 coupled to the CBSD 20-1 from the current radiation pattern to the radiation pattern identified in the entry 34-2. The DSR 48 obtains, from the SAS 22, directly or via a domain proxy 50, the registration object 26-1 associated with the CBSD 20-1. As will be described in greater detail below, the registration object 26-1 contains information that can be used by the DSR 48 to generate a new registration object based on the selected radiation pattern.

The DSR 48 determines the new radiation pattern characteristics of the selected radiation pattern. In one example, the DSR 48 radiation pattern characteristics include or are derived from information identified in the entry 34-2, such as the degree, the loss value, the gain, the transmit power, and the bandwidth. The DSR 48 generates a new registration object that includes the new radiation pattern characteristics and that omits the existing radiation pattern characteristic. The DSR 48 causes the new registration object to be stored by the SAS 22 in lieu of the registration object 26-1.

In this manner, changing the radiation pattern of the CBSD 20-1 eliminates the need for the operator 28 to otherwise determine the new radiation pattern characteristics and enter the new radiation pattern characteristics in the OSS 30, greatly reducing the amount of time it takes to change a radiation pattern, greatly reducing a likelihood of a data calculation error and/or data entry error by the operator 28, and greatly reducing the downtime of the CBSD 20-1.

It is noted that in this example the DSR 48 is illustrated as being a component of the OSS 30, and thus functionality implemented by the DSR 48 may be attributed generally to the OSS 30. In other implementations, the DSR 48 may be separate from the OSS 30, and the OSS 30 and the DSR 48 may communicate with one another via an inter-process communication mechanism such as a RESTful application programming interface (API) or the like.

Moreover, while solely for purposes of illustration the OSS 30 is illustrated as a single component executing on a single computing device 14, in other implementations the functionality described herein with respect to the OSS 30 may be implemented by multiple components executing on any number of computing devices 14 of the computing system 12.

Because the OSS 30 and the DSR 48 are components of the computing device 14, functionality implemented by the OSS 30 and the DSR 48 may be attributed to the computing device 14 generally. Moreover, in examples where the OSS 30 and the DSR 48 comprise software instructions that program the processor device 16 to carry out functionality discussed herein, functionality implemented by the OSS 30 and the DSR 48 may be attributed herein to the processor device 16.

Figure 2:
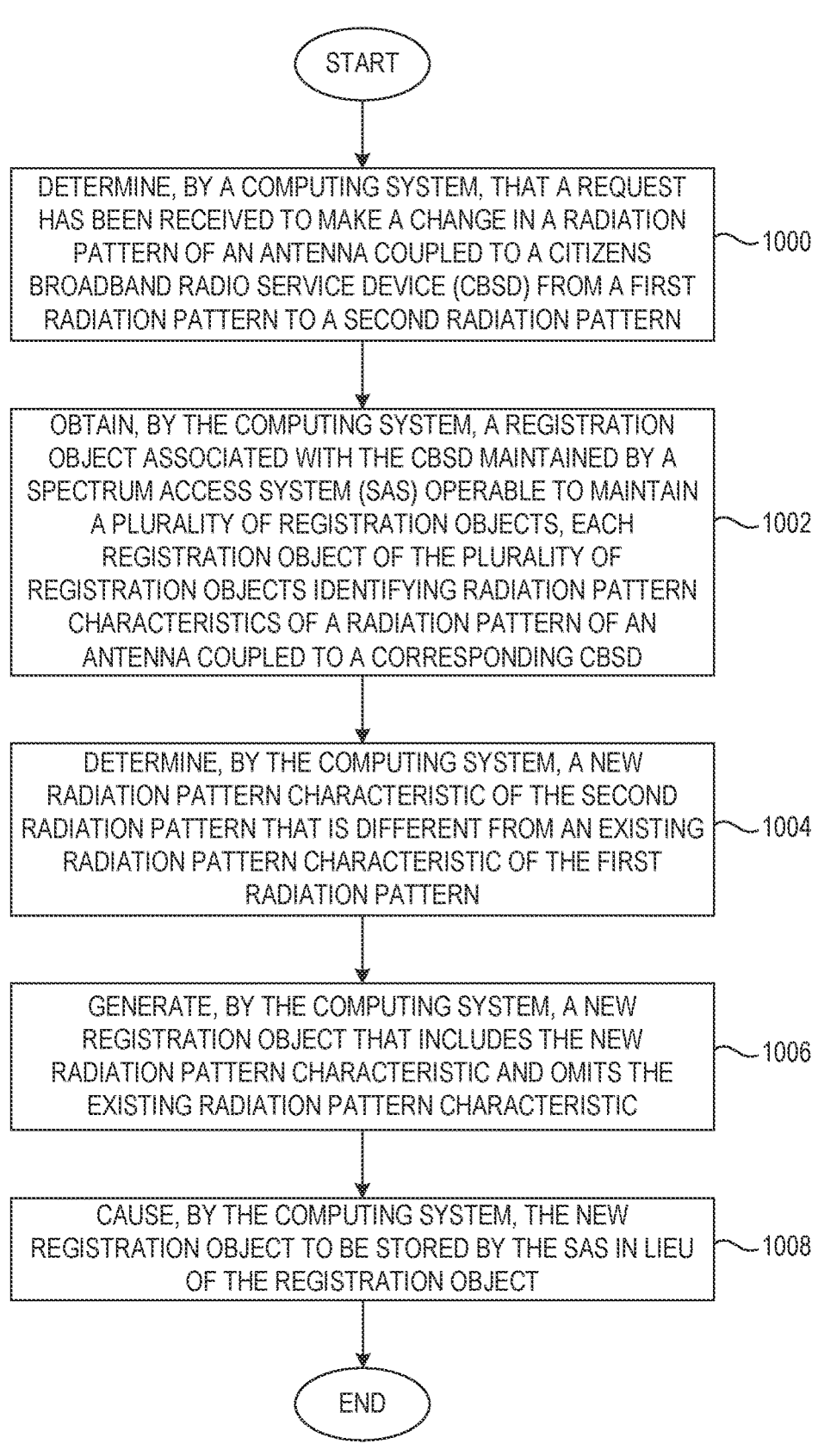
FIG. 2 is a flowchart of a method for automatic antenna radiation pattern registration according to one implementation.

FIG. 2 is a flowchart of a method for automatic antenna radiation pattern registration according to one implementation. FIG. 2 will be discussed in conjunction with FIG. 1. The computing system 12 determines that a request has been received to make a change in a radiation pattern of an antenna 24 coupled to a CBSD 20 from a first radiation pattern to a second radiation pattern (FIG. 2, block 1000). The computing system 12 obtains a registration object 26 associated with the CBSD 20 maintained by the SAS 22 operable to maintain a plurality of registration objects 26, each registration object 26 of the plurality of registration objects 26 identifying radiation pattern characteristics of a radiation pattern of one or more antennas 24 coupled to a corresponding CBSD 20 (FIG. 2, block 1002). The computing system 12 determines a new radiation pattern characteristic of the second radiation pattern that is different from an existing radiation pattern characteristic of the first radiation pattern (FIG. 2, block 1004). The computing system 12 generates a new registration object 26 that includes the new radiation pattern characteristic and omits the existing radiation pattern characteristic (FIG. 2, block 1006). The computing system 12 causes the new registration object 26 to be stored by the SAS 22 in lieu of the registration object 26 (FIG. 2, block 1008).

FIG. 3 illustrates various data fields that may be stored in a registration object 26 by the SAS 22 according to some implementations. Each field may be generated by the DSR 48 when the DSR 48 detects a request to change an antenna radiation pattern. The values stored in fields 52 (eirpCapability, antennaAzimuth, antennaGain, antennaBeamwidth) will generally change for each change in radiation pattern and may be determined by the DSR 48 based on the corresponding entry 34 in the radiation pattern data structure 32. The remaining fields may be determined by the DSR 48 by obtaining the current registration object from the SAS 22 and storing the values in such fields in the new registration object generated by the DSR 48.

Figure 4:
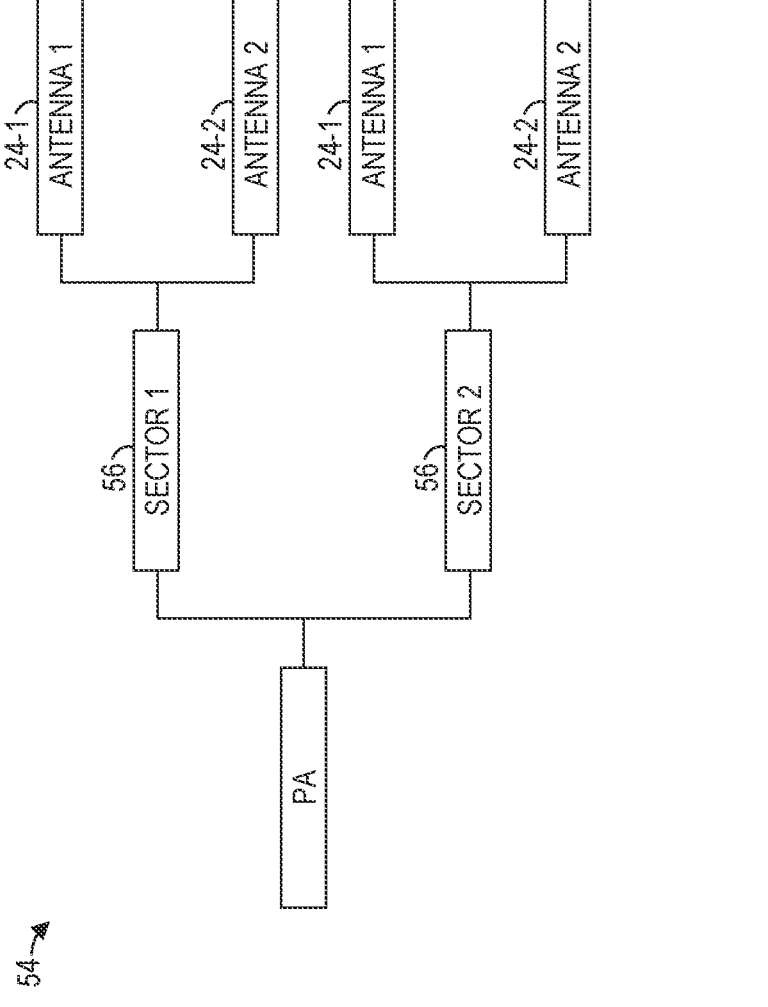
FIG. 4 is a block diagram of a multi-sector multi-antenna Citizens Broadband Radio Service Device (CBSD) according to one implementation.

FIG. 4 is a block diagram 54 of a multi-sector CBSD 20 coupled to two switch beam antennas 24-1, 24-2 according to one implementation. The CBSD 20 can transmit into each of two sectors 56 using, for each sector, one or both antennas 24-1, 24-2 depending on a desired radiation pattern.

Figure 5:
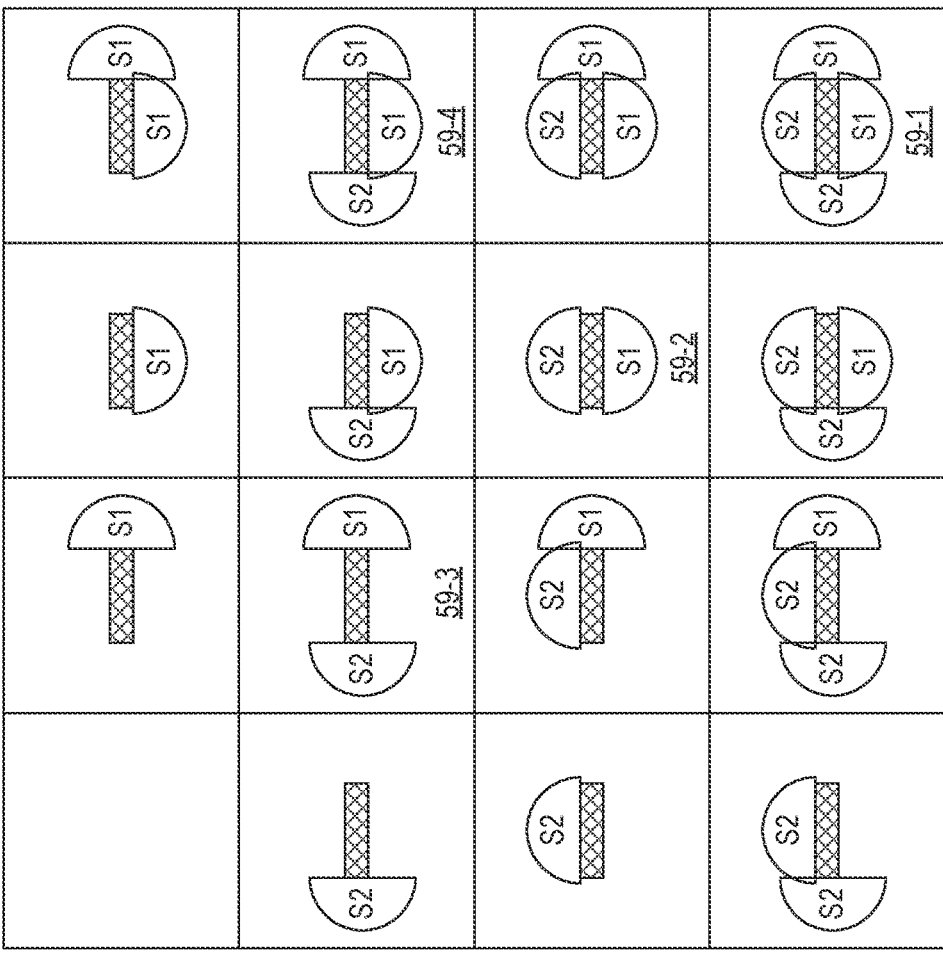
FIG. 5 is a diagram illustrating 15 different potential radiation patterns of the multi-sector multi-antenna CBSD illustrated in FIG. 4.

FIG. 5 is a diagram 58 illustrating 15 different potential radiation patterns of the multi-sector (e.g., S1 and S2) multi-antenna CBSD 20 illustrated in FIG. 4. One example of a radiation pattern is a 360°-Omni pattern 59-1, wherein all antenna elements are active. This may be optimal for covering all around the CBSD 20. Another example of a radiation pattern is a 180°-back-to-back front and back pattern 59-2, wherein one antenna element is active in each sector. This may be optimal for coverage along a strand of CBSDs 20. Another example of a radiation pattern is a 180°-back-to-back left and right side pattern 59-3, wherein one antenna element is active in each sector. This may be optimal for coverage across a strand of CBSDs 20. Another example of a radiation pattern is a 270°-pattern 59-4, wherein, in one sector, one antenna element is active and, in the other sector, two antenna elements are active. This may be optimal for coverage of a "T" intersection.

Figure 6A:
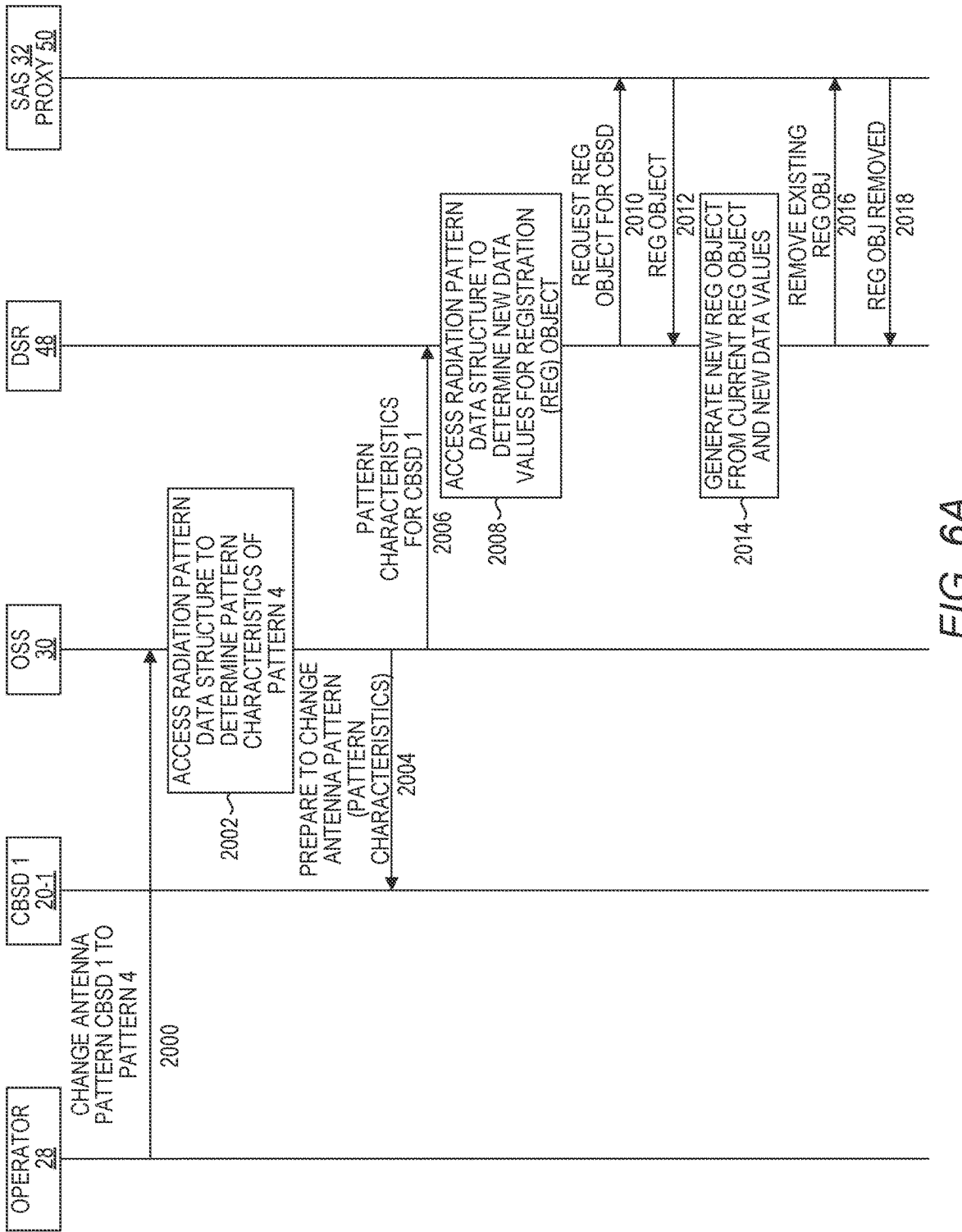
FIGS. 6A-6B illustrate a message sequence diagram illustrating messages communicated between and actions taken by various components illustrated in FIG. 1 during automatic antenna radiation pattern registration according to one implementation.
Figure 6B:
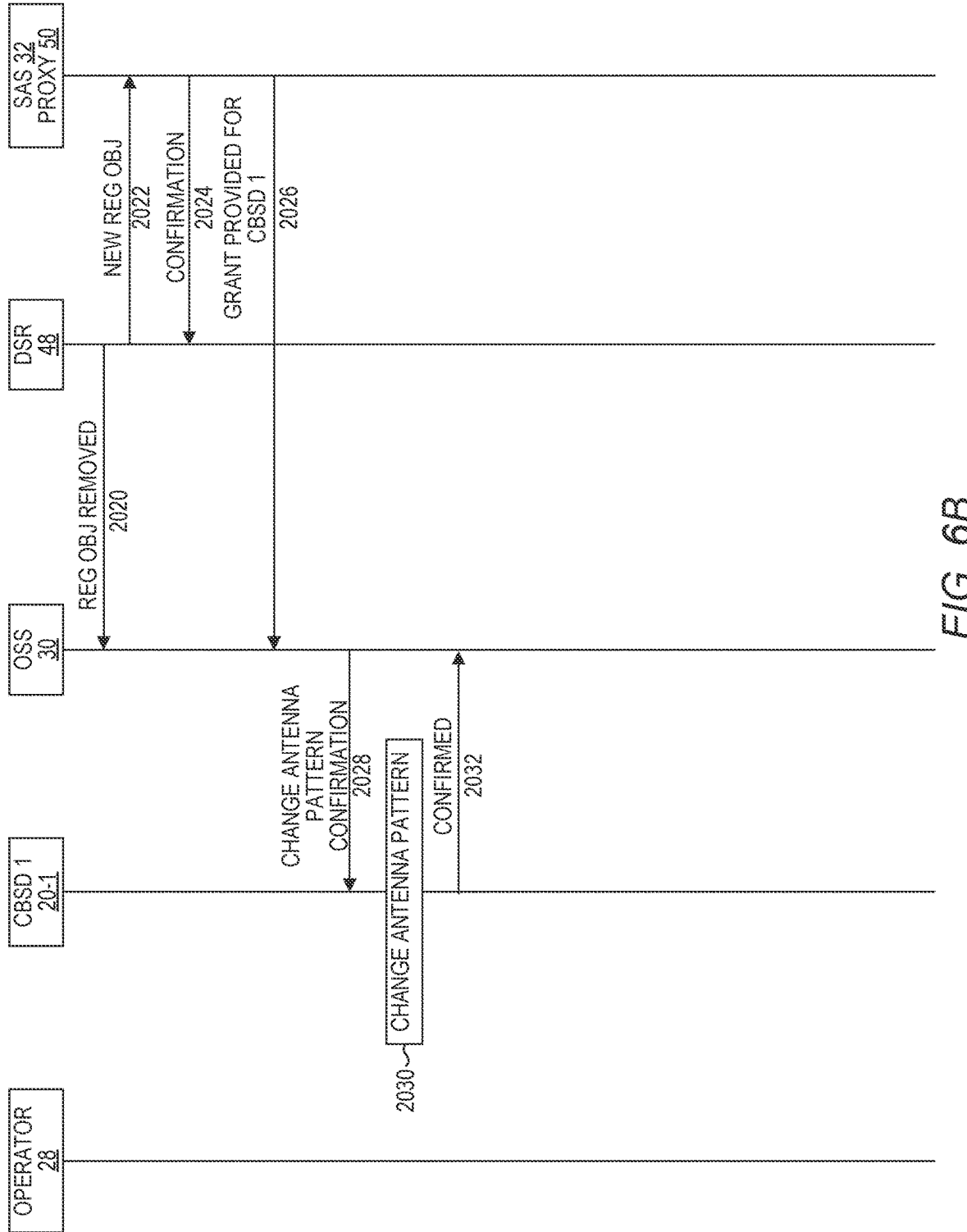

FIGS. 6A-6B illustrate a message sequence diagram illustrating messages communicated between and actions taken by various components illustrated in FIG. 1 during automatic antenna radiation pattern registration according to one implementation. In this example, the operator 28, utilizing a user interface (UI) presented on a display device coupled to the computing device 14, enters a command to change the radiation pattern of the CBSD 20-1 to a radiation pattern 4 (step 2000). The pattern 4, for example, may be one of the patterns illustrated in FIG. 5. The OSS 30 receives the request. In this example, the OSS 30 and the DSR 48 are separate components executing on separate computing devices 14 of the computing system 12. The OSS 30 accesses the radiation pattern data structure 32 to determine the characteristics of the radiation pattern 4 (step 2002). The OSS 30 may send an instruction to the CBSD 20-1 informing the CBSD 20-1 to prepare to change the current radiation pattern to a different radiation pattern having the pattern characteristics identified in the radiation pattern data structure 32 (step 2004). The OSS 30 also sends a message to the DSR 48 identifying the new pattern characteristics that will be radiated by the CBSD 20-1 (step 2006). The message may include the pattern characteristics, or the message may identify a particular entry 34 of the radiation pattern data structure 32. The DSR 48 may have access to the radiation pattern data structure 32 or may maintain a copy of the radiation pattern data structure 32 (step 2008).

The DSR 48 sends a request to the SAS 22 (directly or indirectly via the proxy 50) for the current registration object associated with the CBSD 20-1 (step 2010). The SAS 22 sends the current registration object associated with the CBSD 20-1 to the DSR 48 (directly or indirectly via the proxy 50) (step 2012). The DSR 48 generates a new registration object based on the data fields in the current registration object and the pattern characteristics associated with the radiation pattern 4 (step 2014). The DSR 48 sends a message to the SAS 22 instructing the SAS 22 to remove the existing registration object associated with the CBSD 20-1 (step 2016). The SAS 22 removes the existing registration object associated with the CBSD 20-1 and sends an acknowledgement to the DSR 48 (step 2018).

Referring now to FIG. 6B, the DSR 48 sends a message to the OSS 30 confirming that the existing registration object associated with the CBSD 20-1 has been removed (step 2020). The DSR 48 sends the new registration object to the SAS 22 (step 2022). The SAS 22 validates the new registration object and sends a confirmation to the DSR 48 (step 2024). The SAS 22 sends a grant to the OSS 30 indicating that it is OK to have the CBSD 20-1 begin radiating the new radiation pattern (step 2026). The OSS 30 sends an instruction to the CBSD 20-1 to change the radiation pattern to the new radiation pattern (step 2028). The CBSD 20-1 changes the radiation pattern and begins radiating the new radiation pattern (steps 2030, 2032).

Figure 7:
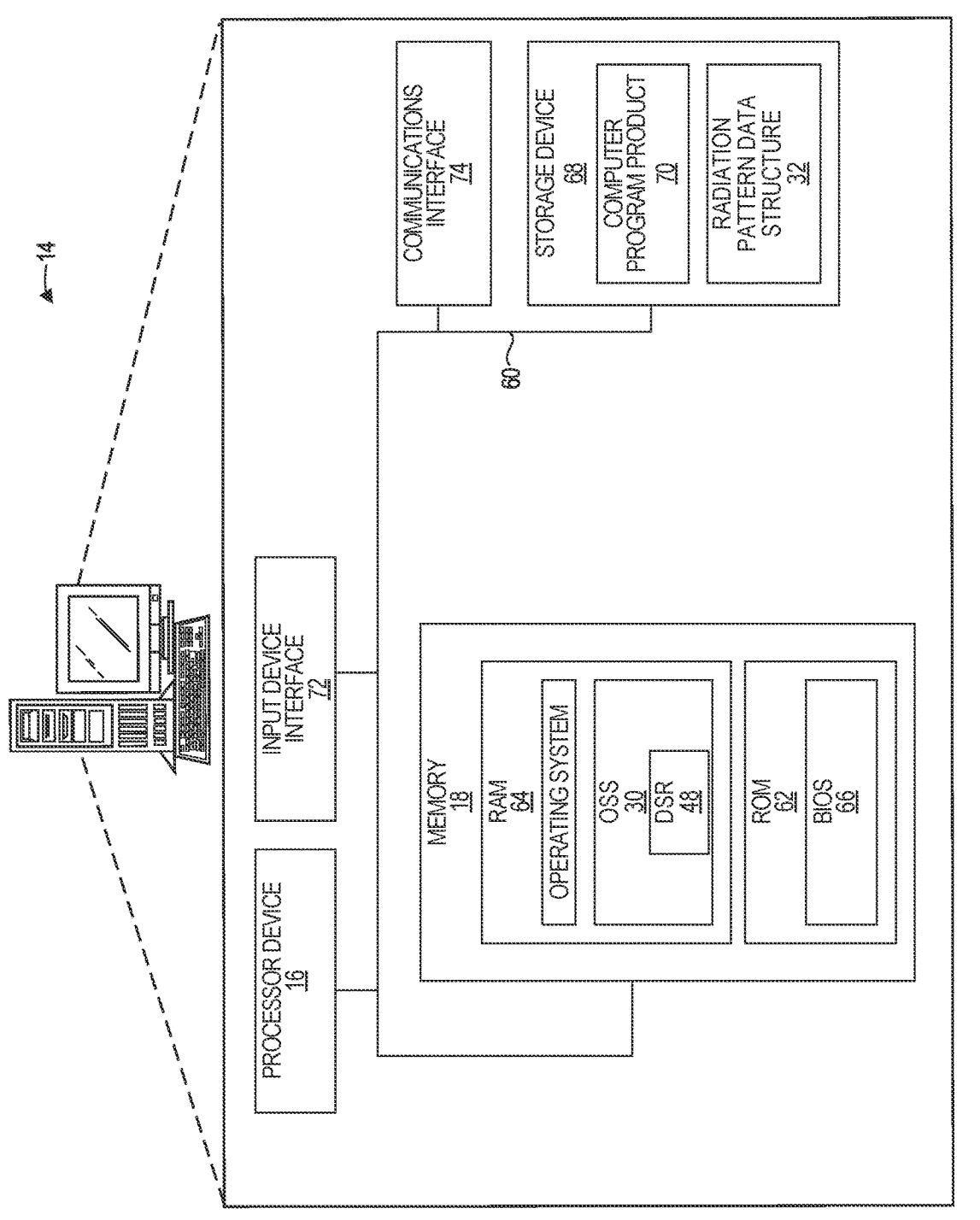
FIG. 7 is a block diagram of a computing device suitable for implementing examples disclosed herein.

FIG. 7 is a block diagram of a computing device 14 suitable for implementing examples disclosed herein. The computing device 14 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 14 includes the processor device 16, the system memory 18, and a system bus 60. The system bus 60 provides an interface for system components including, but not limited to, the system memory 18 and the processor device 16. The processor device 16 can be any commercially available or proprietary processor device.

The system bus 60 may be any of several types of bus structures that may further interconnect to a memory bus (with or without a memory controller), a peripheral bus, and/or a local bus using any of a variety of commercially available bus architectures. The system memory 18 may include non-volatile memory 62 (e.g., read-only memory (ROM), erasable programmable read-only memory (EPROM), electrically erasable programmable read-only memory (EEPROM), etc.), and volatile memory 64 (e.g., random-access memory (RAM)). A basic input/output system (BIOS) 66 may be stored in the non-volatile memory 62 and can include the basic routines that help to transfer information between elements within the computing device 14. The volatile memory 64 may also include a high-speed RAM, such as static RAM, for caching data.

The computing device 14 may further include or be coupled to a non-transitory computer-readable storage medium such as a storage device 68, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 68 and other drives associated with computer-readable media and computer-usable media may provide non-volatile storage of data, data structures, computer-executable instructions, and the like.

A number of modules can be stored in the storage device 68 and in the volatile memory 64, including an operating system and one or more program modules, such as the OSS 30 and the DSR 48. All or a portion of the examples may be implemented as a computer program product 70 stored on a transitory or non-transitory computer-usable or computer-readable storage medium, such as the storage device 68, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the OSS 30 and the DSR 48 in the volatile memory 64, may serve as a controller, or control system, for the computing device 14 that is to implement the functionality described herein.

The operator 28 may also be able to enter one or more configuration commands through a keyboard (not illustrated), a pointing device such as a mouse (not illustrated), or a touch-sensitive surface such as a display device. Such input devices may be connected to the processor device 16 through an input device interface 72 that is coupled to the system bus 60 but can be connected by other interfaces such as a parallel port, an Institute of Electrical and Electronic Engineers (IEEE) 1394 serial port, a Universal Serial Bus (USB) port, an IR interface, and the like. The computing device 14 may also include a communications interface 74 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:

determining, by a computing system, that a request has been received to make a change in a radiation pattern of an antenna coupled to a Citizens Broadband Radio Service Device (CBSD) from a first radiation pattern to a second radiation pattern;

obtaining, by the computing system, a first registration object associated with the CBSD maintained by a spectrum access system (SAS) operable to maintain a plurality of registration objects, each registration object of the plurality of registration objects identifying radiation pattern characteristics of a radiation pattern of an antenna coupled to a corresponding CBSD, the first registration object indicative of an existing radiation pattern characteristic of the first radiation pattern used by the antenna coupled to the CBSD;

based on the first registration object, determining, by the computing system, a new radiation pattern characteristic of the second radiation pattern that is different from the existing radiation pattern characteristic of the first radiation pattern;

generating, by the computing system, a new registration object that includes the new radiation pattern characteristic and omits the existing radiation pattern characteristic; and causing, by the computing system, the new registration object to be stored by the SAS in lieu of the first registration object.

2. The method of claim 1, wherein determining that the request has been made to change the radiation pattern comprises receiving a user input request to change the radiation pattern.

3. The method of claim 1, wherein determining that the request has been made to change the radiation pattern comprises receiving a message from an operations support system identifying the request.

4. The method of claim 1, wherein the change in radiation pattern comprises one or more of a change in azimuth, a change in gain, a change in power, and a change in beamwidth.

5. The method of claim 1, further comprising:

in response to causing the new registration object to be stored by the SAS, receiving, by the computing system, a registration approval message from the SAS; and in response to receiving the registration approval message, sending, to the CBSD, instructions authorizing the CBSD to change the radiation pattern of the antenna from the first radiation pattern to the second radiation pattern.

6. The method of claim 1, wherein obtaining the first registration object associated with the CBSD maintained by the SAS comprises issuing a request to the SAS for the first registration object via a domain proxy.

7. The method of claim 1, wherein determining the new radiation pattern characteristic of the second radiation pattern that is different from the existing radiation pattern characteristic of the first radiation pattern comprises accessing a data structure that identifies the new radiation pattern characteristic.

8. The method of claim 1, wherein generating, by the computing system, the new registration object that includes the new radiation pattern characteristic and omits the existing radiation pattern characteristic comprises storing, in the new registration object, an antenna azimuth value that identifies an azimuth of the antenna, an antenna gain value that identifies a gain of the antenna, and an antenna beamwidth value that identifies a beamwidth of the antenna.

9. A computing system, comprising:

one or more computing devices operable to:

determine that a request has been received to make a change in a radiation pattern of an antenna coupled to a Citizens Broadband Radio Service Device (CBSD) from a first radiation pattern to a second radiation pattern;

obtain a first registration object associated with the CBSD maintained by a spectrum access system (SAS) operable to maintain a plurality of registration objects, each registration object of the plurality of registration objects identifying radiation pattern characteristics of a radiation pattern of an antenna coupled to a corresponding CBSD, the first registration object indicative of an existing radiation pattern characteristic of the first radiation pattern used by the antenna coupled to the CBSD;

based on the first registration object, determine a new radiation pattern characteristic of the second radiation pattern that is different from the existing radiation pattern characteristic of the first radiation pattern;

generate a new registration object that includes the new radiation pattern characteristic and omits the existing radiation pattern characteristic; and cause the new registration object to be stored by the SAS in lieu of the first registration object.

10. The computing system of claim 9, wherein, to determine that the request has been made to change the radiation pattern, the one or more computing devices are further operable to receive a user input request to change the radiation pattern.

11. The computing system of claim 9, wherein, to determine that the request has been made to change the radiation pattern, the one or more computing devices are further operable to receive a message from an operations support system identifying the request.

12. The computing system of claim 9, wherein the change in radiation pattern comprises one or more of a change in azimuth, a change in gain, a change in power, and a change in beamwidth.

13. The computing system of claim 9, wherein the one or more computing devices are further operable to:

in response to causing the new registration object to be stored by the SAS, receive a registration approval message from the SAS; and in response to receiving the registration approval message, send, to the CBSD, instructions authorizing the CBSD to change the radiation pattern of the antenna from the first radiation pattern to the second radiation pattern.

14. The computing system of claim 9, wherein, to obtain the first registration object associated with the CBSD maintained by the SAS, the one or more computing devices are further operable to issue a request to the SAS for the first registration object via a domain proxy.

15. The computing system of claim 9, wherein, to determine the new radiation pattern characteristic of the second radiation pattern that is different from the existing radiation pattern characteristic of the first radiation pattern, the one or more computing devices are further operable to access a data structure that identifies the new radiation pattern characteristic.

16. The computing system of claim 9, wherein, to generate the new registration object that includes the new radiation pattern characteristic and omits the existing radiation pattern characteristic, the one or more computing devices are further operable to store, in the new registration object, an antenna azimuth value that identifies an azimuth of the antenna, an antenna gain value that identifies a gain of the antenna, and an antenna beamwidth value that identifies a beamwidth of the antenna.

17. A non-transitory computer-readable storage medium that includes executable instructions to cause one or more computing devices to:

determine that a request has been received to make a change in a radiation pattern of an antenna coupled to a Citizens Broadband Radio Service Device (CBSD) from a first radiation pattern to a second radiation pattern;

obtain a first registration object associated with the CBSD maintained by a spectrum access system (SAS) operable to maintain a plurality of registration objects, each registration object of the plurality of registration objects identifying radiation pattern characteristics of a radiation pattern of an antenna coupled to a corresponding CBSD, the first registration object indicative of an existing radiation pattern characteristic of the first radiation pattern used by the antenna coupled to the CBSD;

based on the first registration object, determine a new radiation pattern characteristic of the second radiation pattern that is different from an existing radiation pattern characteristic of the first radiation pattern;

generate a new registration object that includes the new radiation pattern characteristic and omits the existing radiation pattern characteristic; and cause the new registration object to be stored by the SAS in lieu of the first registration object.

18. The non-transitory computer-readable storage medium of claim 17, wherein the executable instructions are further operable to cause the one or more computing devices to:

in response to causing the new registration object to be stored by the SAS, receive a registration approval message from the SAS; and in response to receiving the registration approval message, send, to the CBSD, instructions authorizing the CBSD to change the radiation pattern of the antenna from the first radiation pattern to the second radiation pattern.

19. The non-transitory computer-readable storage medium of claim 17, wherein, to determine the new radiation pattern characteristic of the second radiation pattern that is different from the existing radiation pattern characteristic of the first radiation pattern, the executable instructions are further operable to cause the one or more computing devices to access a data structure that identifies the new radiation pattern characteristic.

20. The non-transitory computer-readable storage medium of claim 17, wherein, to generate the new registration object that includes the new radiation pattern characteristic and omits the existing radiation pattern characteristic, the executable instructions are further operable to cause the one or more computing devices to store, in the new registration object, an antenna azimuth value that identifies an azimuth of the antenna, an antenna gain value that identifies a gain of the antenna, and an antenna beamwidth value that identifies a beamwidth of the antenna.

* * * * *